United States Patent [19]

Pidcoe

[11] Patent Number: 5,142,212
[45] Date of Patent: Aug. 25, 1992

[54] BREAK-WAY END-OF-ARM ROBOTIC TOOLING ASSEMBLY

[75] Inventor: Stephen V. Pidcoe, Bonita, Calif.

[73] Assignee: General Dynamics Corporation, San Diego, Calif.

[21] Appl. No.: 762,662

[22] Filed: Sep. 19, 1991

[51] Int. Cl.⁵ ............................................. G05G 11/00
[52] U.S. Cl. ................... 318/568.11; 318/567; 74/479; 901/23; 901/26; 92/48
[58] Field of Search ................... 318/567–573; 395/88–99; 901/1, 2, 3, 6, 8, 9, 12–24, 25–32, 45, 48, 43; 74/479, 89.15, 89.22

[56] References Cited

U.S. PATENT DOCUMENTS

| | | | |
|---|---|---|---|
| 4,697,472 | 10/1987 | Hiyane | 901/24 X |
| 4,697,838 | 10/1987 | Hartman | 901/29 |
| 4,697,978 | 10/1987 | Tada et al. | 901/28 X |
| 4,922,755 | 5/1990 | Oshiro et al. | 901/23 X |
| 4,976,191 | 12/1990 | Suzumori et al. | 92/48 |

Primary Examiner—Paul Ip
Attorney, Agent, or Firm—John R. Duncan; Frank D. Gilliam

[57] ABSTRACT

An improved break-away, end-of-arm robotic tooling assembly that has been designed to prevent damage to the robot arm in the event it would come in contact with something it should not. The robotic tooling assembly has a two inch inside diameter bore for air and paint lines. The robotic tooling assembly is compliant in all directions with the exception of a pulling force and it can be reset on repeating registration structure within the robotic tooling assemble. An air switch is incorporated which instantly signals the robot controller to perform an emergency stop.

8 Claims, 2 Drawing Sheets

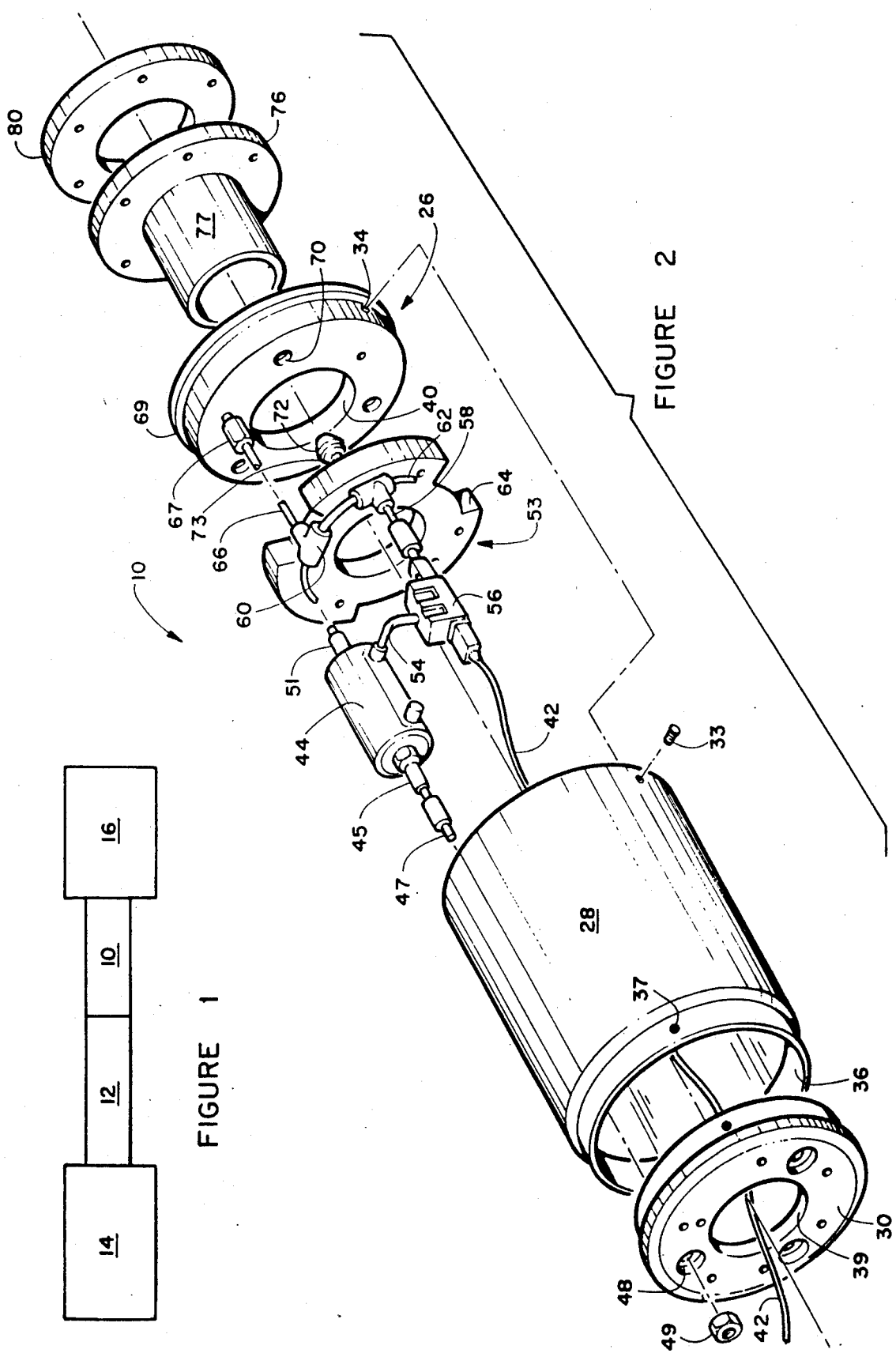

BREAK-WAY END-OF-ARM ROBOTIC TOOLING ASSEMBLY

BACKGROUND OF THE INTENTION

The present invention relates to robots and more specifically to break-away, end-of arm robotic tooling.

Presently a problem exists because the current break-away, end-of-arm robotic tooling is electrical and cannot be used in Class 1, Division 1, explosive environment. An example of such an environment would be one that allows the robot to perform a painting application. Another necessary requirement for allowing a robot to perform a painting operation is for the robotic arm to have a two inch bore through its center to accommodate paint and air lines.

It is an object of the invention to provide a novel pneumatic, break-away, end-of-arm robotic tooling assembly that can be used in a Class 1, Division 1, explosive environment.

It is another object of the invention to provide a novel pneumatic, break-away, end-of-arm robotic tooling assembly that has a two inch inside diameter bore for air and paint lines.

It is a further object of the invention to provide a novel improved break-away, end-of-arm robotic tooling assembly that is compliant in all directions with the exception of a pulling force and which can be reset on repeatable registration internal structure.

It is an additional object of the invention to provide an improved break-away, end-of-arm robotic tooling assembly that incorporates an air switch which instantly signals the robot controller to perform an emergency stop should the robot arm come in contact with something it should not and which has disrupted its predetermined axial alignment.

SUMMARY OF THE INVENTION

The novel improved break-away, end-of-arm robotic tooling assembly has been designed to eliminate problems of the past wherein the prior art tooling assemblies were electrical and they could not be used in a Class 1, Division 1, explosive environment. The solution to this problem has been to design a pneumatic, break-away, end-of-arm tooling assembly. With the elimination of the electrical circuitry the novel robotic tooling assembly can be used in a painting application. The robotic tooling assembly has been designed with a two inch bore through its center to accommodate paint and air lines.

The improved break-away, end-of-arm robotic tooling assembly has been designed to prevent damage should the robot arm come in contact with something it should not. The robotic tooling assembly is compliant in all directions with the exception of a pulling force and it can be reset on repeatable registration structure incorporated in its design. The key to this operation is using tooling balls and seats for a dual purpose. The first of these is repeatable registration and the second is as a pressure chamber which signals the air switch instantly if any of the three balls are unseated. The air switch then signals the robot controller to perform an emergency stop.

DESCRIPTION OP THE DRAWINGS

FIG. 1 is a schematic illustration of the improved break-away, end-of-arm robotic tooling assembly connected to a robot and also to a paint sprayer:

FIG. 2 is an exploded perspective view of the novel improved break-away, end-of-arm robotic tooling assembly:

DESCRIPTION OF THE PREFERRED EMBODIMENT

Figure 3:
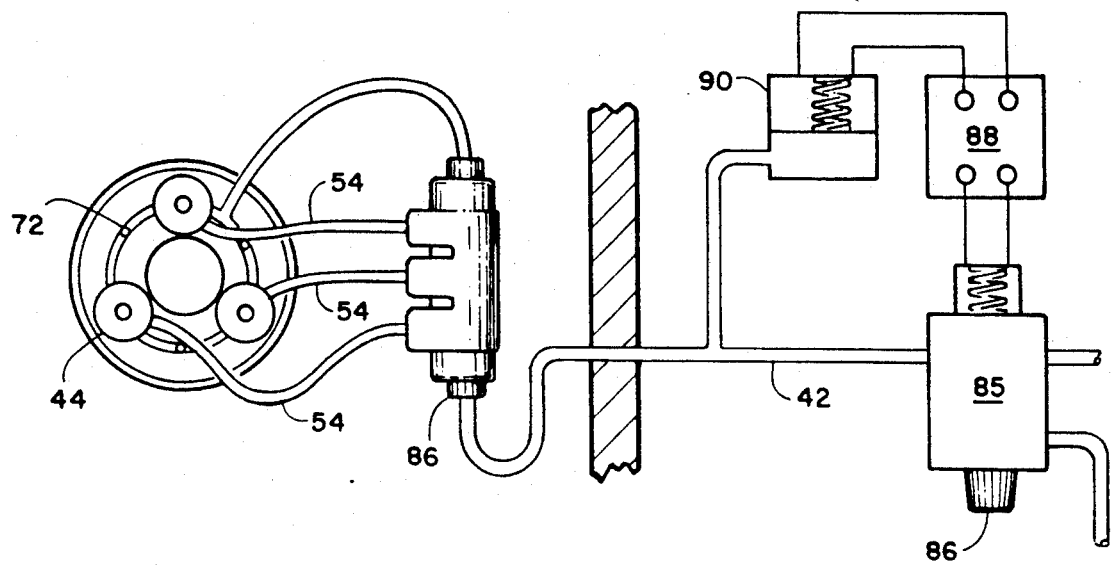
FIG. 3 is a schematic illustration showing the manner in which the balls and ball seats are connected to a pneumatic system that incorporates an air switch.

The environment in which the novel invention is utilized is schematically illustrated in FIG. 1. The break-away, end-of-arm robotic tooling assembly is generally designated numeral 10 and it has its one end connected to an arm assembly 12 of a robot 14. The other end of robotic tooling assembly 10 is detachably connected to a paint sprayer 16.

Figure 4:
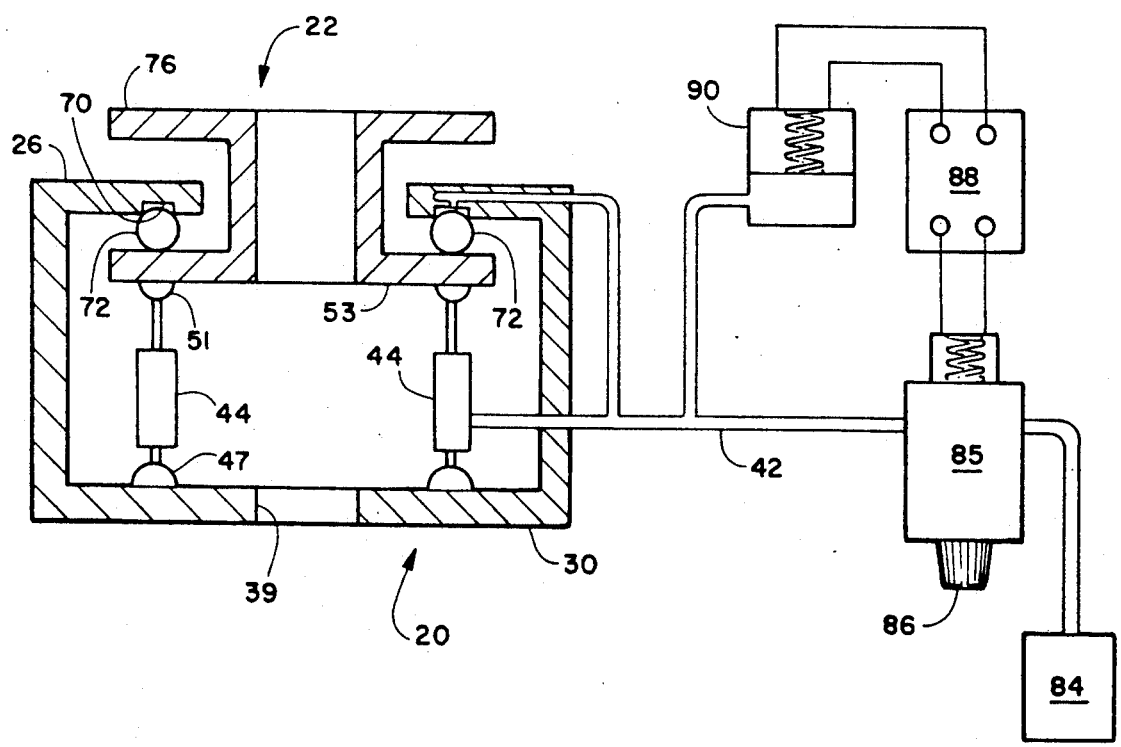
FIG. 4 is a schematic illustration of the basic structure of the improved break-away, end-of-arm robotic tooling assembly showing the manner in which the air switch is actuated if any of the balls are unseated.

The discussion of robotic tooling assembly 10 will now be commenced by referring to FIGS. 2-4 of the drawings. Robotic tooling assembly 10 has two main parts, outer barrel 20 and inner hub 22.

Outer barrel 20 is formed from a front disc plate 26, a primary tubular sleeve 28, and a rear disc plate 30. Tubular sleeve 28 is detachably secured to front disc plate 26 by screws 33 that are inserted into threaded apertures 34. Rear disc plate 30 is detachably secured to the rear end of tubular sleeve 28 by screws 36 that are received in threaded apertures 37. Tubular sleeve 28 has an inner diameter D1 that is greater than the two inch bores 39 and 40 of the respective rear and front disc plates which allows air supply tube 42 to pass therethrough.

Three air cylinders 44 each have a piston rod 45. A threaded shank on the end of piston rod 45 passes through counter-sunk holes 48 in rear disc plate 30 and are secured in position by nuts 49. A threaded shank 51 extends from each of the air cylinders 44 and these are received in bore holes 52 of the rear disc 53 of inner hub 22.

An air tube 54 is connected to each of the air cylinders 44 and also to manifold 56. An air tube 58 is also connected to manifold 56. Air tube 58 is connected to a series of T-shaped couplings that are connected to each other by short sections of air tubing 62. A plurality of cutout slots 64 in rear disc 53 allow some of the T-shaped couplings 60 to protrude therethrough and these are connected to air tubing sections 66 that are connected to couplings 67 whose ends are inserted into one end of the pressurized cavities 69. The other ends of these pressurized cavities have a ball seat 70 formed thereat. Ball members 72 have a shank that is attached to rear disc 53. The ball members 72 are aligned with ball seats 70 and are received therein when the air cylinders 44 are actuated to force rear disc 53 toward front disc plate 26.

Inner hub 22 is formed from a front disc 76, a tubular sleeve 77 and rear disc 53. These three members have a two inch bore. A robot wrist disc 80 is detachably secured to front disc 76 by bolts passing through its respective threaded bolt apertures.

The compressed air circuit is best discussed by referring FIGS. 3 and 4. A source of compressed air 84 is connected by various sections of air tubing to tube 42. There is an air valve 85 having a regulator 86 connected between these two members. Air valve 85 is also connected to robot controller 88 which is in turn connected to air switch 90.

In operation, the two main parts, outer barrel 20 and inner hub 22 are separated by three balls 72 and ball seats 70 and they are held rigid by pneumatic cylinder pressure. If enough external force is applied to compress one or all of the pneumatic cylinders, then one or more balls will unseat, causing the air switch 90 to sense a pressure drop instantly. Air switch 90 then signals the robot controller 88 to stop the robot and exhaust air in the pneumatic cylinders 44, causing the device to go limp. The device can be reset by restoring air pressure. Force required to unseat the balls 72 is variable by adjusting cylinder pressure. The air switch is also adjustable to achieve optimal sensitivity.

What is claimed is:

1. An improved break-away, end-of-arm robotic tooling assembly comprising:
    an elongated barrel assembly having a primary tubular sleeve, an front disc plate and a rear disc plate, said front and rear disc plates having a bore whose diameter is less than the inner diameter D1 of said tubular sleeve to form inwardly extending flanges on the front and rear ends of said tubular sleeves
    a hub having a front disc, a secondary tubular sleeve and a rear disc, said rear disc having a diameter less than D1 and being captured within said barrel assembly, said secondary tubular sleeve having an outer diameter less than the inner diameter of the bore of the front disc plate of said barrel assembly and said secondary tubular sleeve extends forwardly therethrough;
    means for forcing the rear disc of said hub toward the front disc plate of said barrel assembly; and
    means for axially aligning the rear disc of said hub with the front disc plate of said barrel assembly in a predetermined axially aligned static position.

2. An improved break-away, end-of-arm robotic tooling assembly as recited in claim 1 wherein said means for forcing the rear disc member of said hub toward the front disc plate of said barrel assembly comprises a plurality of air cylinders connected to a source of compressed air.

3. An improved break-away, end-of-arm robotic tooling assembly as recited in claim 1 wherein said means for axially aligning the rear disc of said hub with the front disc plate of said barrel assembly comprises a plurality of alignment members that are detachably received in alignment seats in the front disc plate of said barrel assembly.

4. An improved break-away, end-of-arm robotic tooling assembly as recited in claim 3 wherein said alignment members have the general shape of a ball.

5. An improved break-away, end-of-arm robotic tooling assembly as recited in claim 3 further comprising a means for signaling when the axially aligned static position of the rear disc of said hub and the front disc plate of said barrel assembly has been disrupted.

6. An improved break-away, end-of-arm robotic tooling assembly as recited in claim 5 wherein said means for signaling when the axially aligned static position of the rear disc of said hub and the front disc plate of said barrel assembly has been disrupted comprises a source of compressed air that is connected to a robot controller which is then connected to an air switch capable of sensing a pressure drop, and said air switch is connected by air tubes to pressurized air cavities in the front disc plate of said barrel assembly, said pressurized air cavities being in communication with said alignment members so that movement of one or more of said alignment members out of their respective alignment seats will cause an air pressure loss that would be detected by said switch.

7. An improved break-away, end-of-arm robotic tooling assembly as recited in claim 6 further comprising a manifold that is connected to said source of pressurized air and also to said air cylinders and said pressurized air cavities.

8. An improved break-away, end-of-arm robotic tooling assembly as recited in claim 1 further comprising a robot wrist disc detachably secured to the front disc of said hub.

* * * * *